June 11, 1929.　　　D. R. FRANCIS　　　1,716,881
REVERSING VALVE
Original Filed Oct. 9, 1926　　2 Sheets-Sheet 1
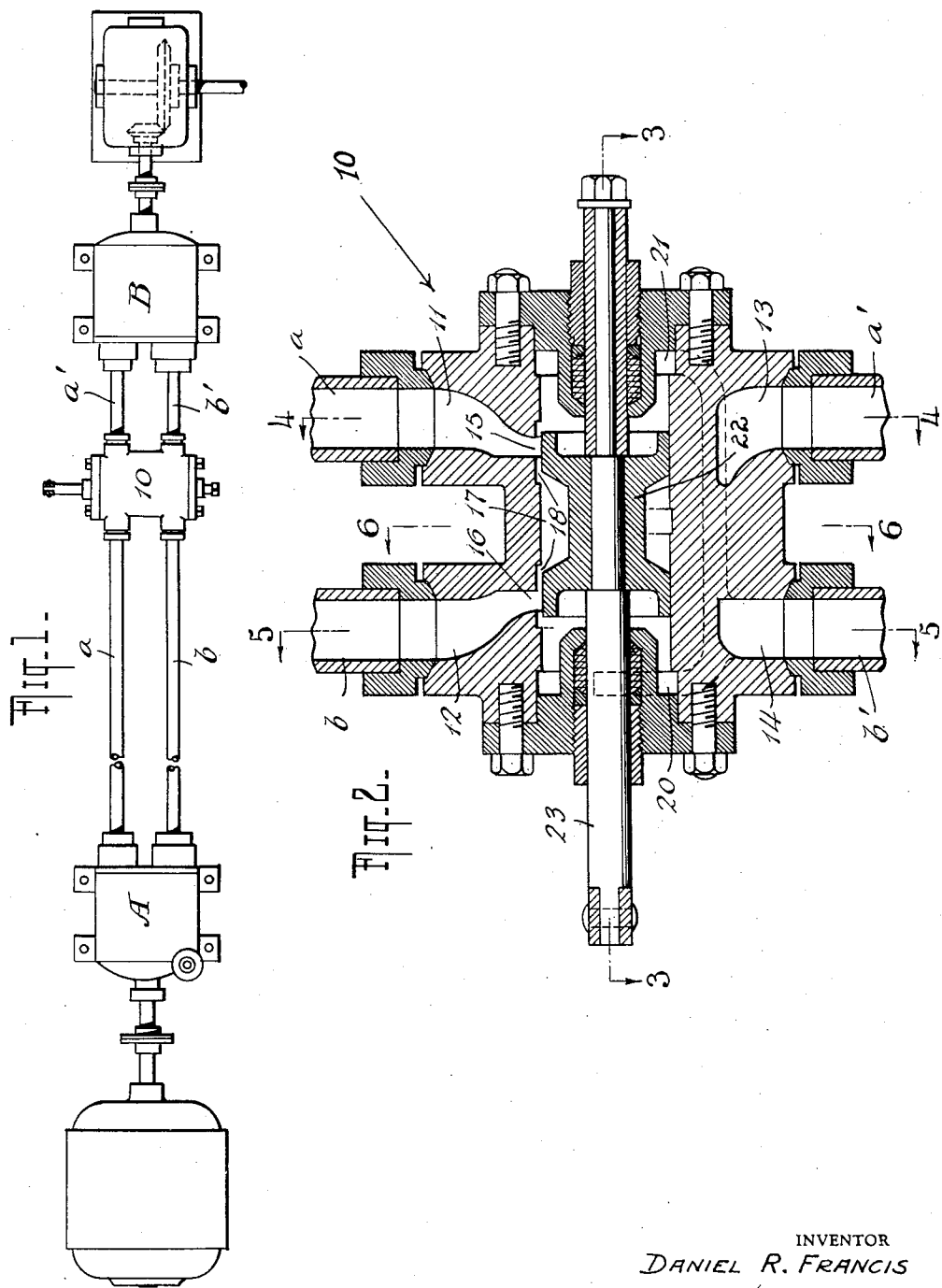
INVENTOR
DANIEL R. FRANCIS
BY
ATTORNEYS

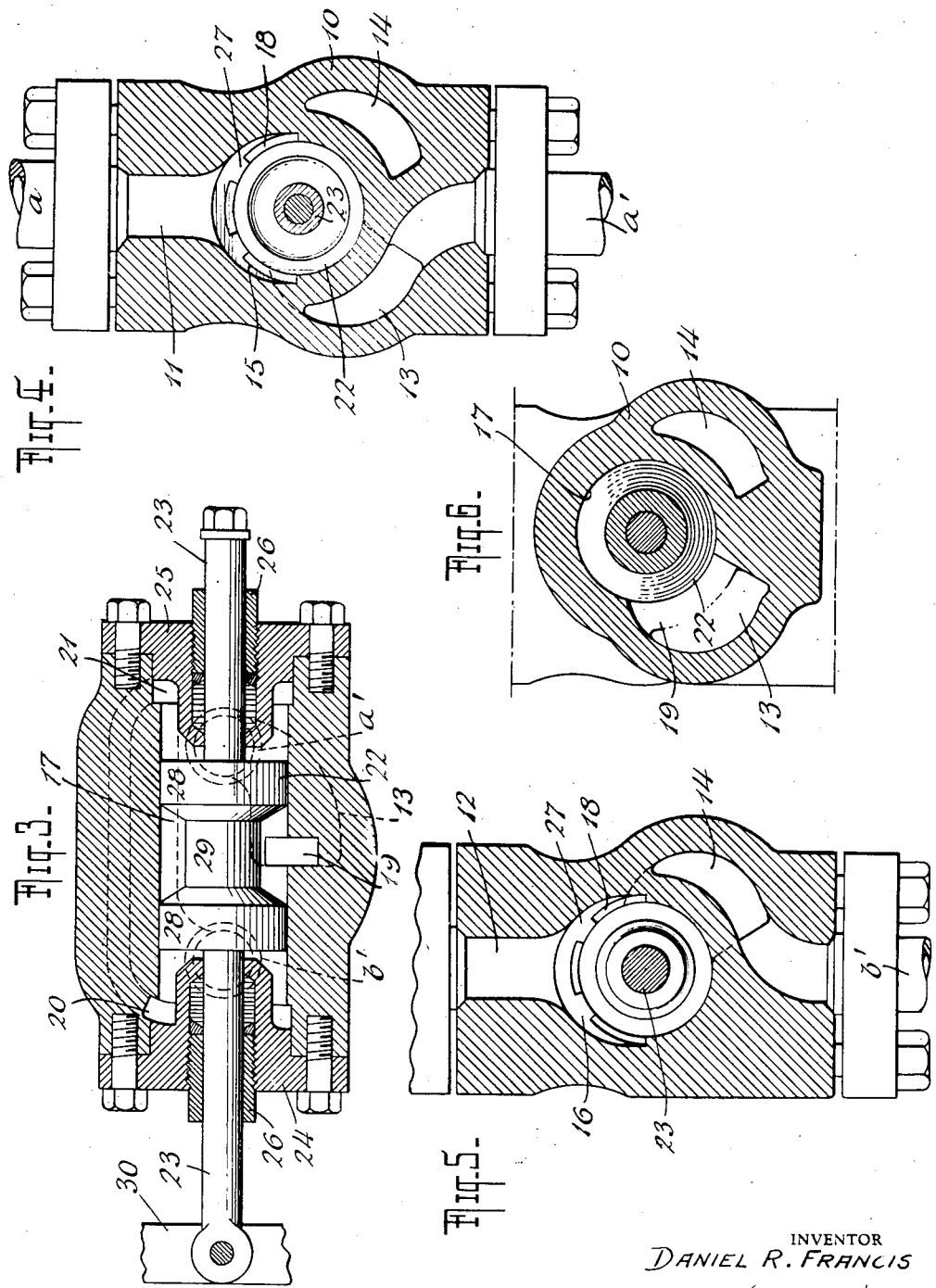

Patented June 11, 1929.

1,716,881

UNITED STATES PATENT OFFICE.

DANIEL ROBERT FRANCIS, OF WATERBURY, CONNECTICUT, ASSIGNOR TO THE WATERBURY TOOL COMPANY, OF WATERBURY, CONNECTICUT, A CORPORATION OF CONNECTICUT.

REVERSING VALVE.

Original application filed October 9, 1926, Serial No. 140,433. Divided and this application filed August 29, 1927. Serial No. 216,066.

This invention relates to reversing valves, and particularly to 4-way valves, by means of which the flow of fluid in a pair of conduits may be reversed.

The principal object of the invention is to provide a new and improved construction for such a valve, by means of which the valve, in addition to serving to reverse the flow of fluid, may also be used for by-passing the fluid from one conduit to another.

A further object is to provide a construction which will be not only relatively simple and inexpensive to manufacture, but which will be easy to install.

Another object is to so construct the valve that it will be substantially leak-proof and which will require a minimum of attention for its maintenance.

Another object is to so construct the valve that it may be readily inserted in place within a pair of parallel pipe lines, or may be used to connect two pairs of axially aligned parallel pipe lines.

The above and other objects will appear more fully from the following more detailed description and by reference to the accompanying drawings forming a part hereof, wherein Fig. 1 is a diagrammatic view showing a type of installation with which the valve of my invention is particularly adapted for use; Fig. 2 is an enlarged central longitudinal section through a valve constructed in accordance with the principles of this invention; Fig. 3 is a longitudinal section on the line 3—3 of Fig. 2, and Figs. 4, 5 and 6 are transverse cross sections on the lines 4—4, 5—5 and 6—6 of Fig. 2.

In the diagrammatic illustration shown in Fig. 1 the valve is illustrated as interposed within the two parallel pipe lines which consist of the two axially aligned parallel pairs of conduits $a$—$b$, and $a'$—$b'$. These conduits furnish communication in the particular example illustrated between a hydraulic pump A and a fluid pressure motor B. The constructional details of the pump and motor are not illustrated, as such details form no part of the present invention. It will be sufficient for the purposes of the present disclosure to state that fluid from the pump is circulated by means of the two parallel pipe lines to and from the motor B. The diagrammatic illustration is intended to indicate a type of mechanism known as a hydraulic speed gear, and more particularly the well known speed gear, called a Waterbury gear. In mechanisms of this type it is the common practice to provide a pump, the output of which may be varied or reversed by means of an adjustable control shaft, and the fluid from the pump is circulated under a pressure to the motor, which usually is not provided with any adjusting members for varying its effect. In installations such as shown in my co-pending application, Serial #140,433, filed October 9, 1926, of which this case is a division, it is desirable to provide means whereby the direction of rotation of the motor may be reversed, and the motor may also be rendered inoperative by by-passing the fluid under pressure directly from one pipe line to the other without interrupting the operation of the pump or changing the adjustment of its control shaft. In order to secure the desired result a 4-way reversing valve 10 is connected across the pipe lines $a$—$b$ and is so constructed that when the valve is set in one of its positions, the fluid will pass, say from the pipe $b$, directly to the motor B and will return by the pipe $a$ to the pump A. In another of its positions the flow of the fluid from the motor will be reversed so that the ports of the motor which formerly were the suction and pressure ports will become pressure and suction ports respectively, while in still another position of the valve the fluid will be caused to pass directly across from the pipe $b$ to the pipe $a$.

As shown in Figs. 2 to 6 of the drawings, said valve comprises an outer casing 10 having four flanged conduits 11, 12, 13 and 14. The conduits 11 and 12 are located upon one side of the valve casing, and the conduits 13 and 14 are located upon the other side thereof and in axial alignment with the conduits 11 and 12 respectively. The provision of the axially aligned conduits enables the valve, as shown in Figs. 1 and 2, to be readily connected or interposed within the two pairs of axially aligned conduits.

As shown in Fig. 2 the ends of the pipes $a$, $b$, which lead to the pump, are connected to the conduits 11 and 12 respectively, while the ends of the pipes $a'$, $b'$ which extend from the valve casing to the fluid pressure motor B, are connected to the conduits 13 and 14. The conduits 11 and 12 are of similar construction and terminate at their inner ends in elongated ports 15 and 16, through which the conduits communicate with a cylindrical valve chamber 17. These ports extend approximately half way around the circumference of the valve chamber, and a plurality of recesses or depressions 18 are provided in the wall of the valve chamber adjacent to and in communication with the ports 15, 16 for a purpose presently to be described. The conduit 13 terminates in a port 19 located substantially midway of the valve chamber 17 and in communication with said chamber, while the conduit 14 branches and terminates in two ports 20 and 21, located one at each end of, and in communication with, said valve chamber.

Slidably mounted within the valve chamber 17 is a piston valve 22, suitably secured to a valve operating rod 23, said rod extending at each end outwardly beyond the valve casing and being slidably mounted in packing boxes 24, 25 detachably secured to the valve casing; each of said packing boxes being provided with stuffing glands 26 to prevent leakage of the fluid about the valve rod in accordance with the usual construction of devices of this character. It will be noted that a plurality of webs 27 are provided betweeen the recesses 18 for furnishing bearing surfaces for the piston valve.

The piston valve is of the same general configuration as used for locomotive slide valves and has a pair of annular bearing surfaces 28 at each of its ends, between which surfaces the valve body is reduced, as indicated by the reference character 29.

The operation is as follows: Assuming that the pipes $a$ and $b$ are the suction and pressure pipes respectively, it will be seen that when the valve 22 is moved to its extreme position to the right of Fig. 2 of the drawing, the bearing surfaces of the valve will be located to the right of the ports 15 and 16 respectively. In this position of the valve, the pipe $a$ will be in communication with the pipe $a'$ and the pipe $b$ in communication with the pipe $b'$, the fluid passsing to the motor through pipe $b$, conduit 12, port 16, through the valve chamber 17 to the left of the valve, entering port 20 and passing through conduit 14 to the pipe $b'$; while the fluid passing from the motor will flow through the pipe $a'$, conduit 13, port 19, around the reduced central portion 29 of the valve, and thence through port 15, and conduit 11 to the pipe $a$. When the valve is moved to the extreme left of Fig. 2 of the drawing, the fluid will then flow from the pipe $b$ through conduit 12, port 16, through the valve chamber 17, around the reduced portion 29 of the valve, and, entering port 19, will flow through the conduit 13 to the pipe $a'$; while the fluid from the motor will leave through the pipe $b'$, conduit 14, port 21, and will flow from port 21 through the valve chamber 17, past the right end of the valve 22 to port 15 and conduit 11 thence to the suction pipe $a$. When the valve is in the midway position shown in the drawings, the fluid will be by-passed from the pipe $b$ to the pipe $a$, the fluid passing from the pipe $b$ through conduit 12 and port 16 to the recesses 18 of said port from which it flows through the valve chamber around the reduced portion 29 of the valve to the recesses 18 of the port 15 and thence through the port 15 and conduit 11 to the pipe $a$.

Any suitable means may be provided for operating the valve 22; as shown in the drawings, one end of the valve rod 23 is reduced to provide a straight sided tongue with which is engaged the yoked jaws of a lever 30. The lever 30 may be actuated in any suitable manner as for example by having one end thereof pivotally secured to any suitable support and the other end provided with a handle by means of which the lever may be swung upon its pivot to slide the valve to its different operative positions.

It will be seen that the valve herein disclosed requires but a minimum amount of movement to effect either a complete reversal of the direction of flow of the fluid through the motor B or to stop entirely the flow of fluid to the motor, and that these functions are performed by a much smaller amount of movement of the valve plug than is required where a rotatable member is employed in a reversing valve. Furthermore, it is possible with a valve constructed in accordance with the principles herein disclosed, to more effectively prevent leakage of the fluid past the valve surfaces or from said valve casing.

While I have shown and described the valve as connected in an installation consisting of a pump and motor, it will be understood that the invention is not limited in its application to the particular apparatus shown in Fig. 1, but that it is applicable to any installation in which it is desirable to reverse the direction of flow of the fluid or to by-pass the fluid from one pipe line to another.

It will also be understood that many changes, variations and modifications of the particular constructional details of the valve may be resorted to without departing from the spirit of my invention.

I claim:

1. A valve comprising a casing provided with two sets of axially aligned conduits, means to connect said conduits with the opposed ends of two pairs of pipe lines, said valve casing being provided with a valve chamber and ports through which said conduits communicate with said chamber, and a valve member mounted within said chamber and movable to a plurality of different set positions, in one of which the members of each pair of conduits are in direct communication with each other, in a second position of said valve member, one member of each pair of conduits is in communication with a member of the other pair of conduits, and in a third position of said valve member, a member of each pair of conduits is in communication with a different member of the other pair of conduits than when said valve is in said second position.

2. In a valve, a valve casing provided with two pairs of axially aligned conduits, means to connect said conduits with the opposed ends of two pairs of pipe lines, a valve chamber, ports for establishing communication between said conduits and chamber, and recesses adjacent to and in communication with certain of said ports; and a valve member movably mounted in said chamber for selective movement to a plurality of different set positions, in one of which, communication is established between the respective members of each of said pair of conduits, in another of said positions communication is established between the members of one pair of conduits with the members of the other pair, and in a third position of said valve member communication is established through recesses and said valve chamber between said certain ports.

3. In a valve, a valve casing having two pairs of axially aligned conduits and means for connecting said conduits between the opposed ends of two pairs of pipe lines, said valve casing being provided with a cylindrical valve chamber, ports establishing communication between said chamber and said conduits, and recesses adjacent to the ports for one of the members of each of said pair of conduits; a valve piston slidably mounted in said chamber for movement to a plurality of set positions, in one of which communication is established through said ports and chamber between the respective members of each pair of conduits, in a second position of said piston one of the members of one of said pair of conduits is in communication with one of the members of said other pair, and in a third position, communication is established through said ports, recesses and said valve chamber between one of the members of one of said pair of conduits and a different member of the other pair of conduits than when said valve is in said second position.

In testimony whereof I have hereunto set my hand.

DANIEL ROBERT FRANCIS.